Dec. 5, 1944.   H. KLEMPERER   2,364,079

CONDENSER WELDING SYSTEM

Filed April 15, 1943

INVENTOR.
HANS KLEMPERER,
By Elmer J. Gorn
ATTY.

Patented Dec. 5, 1944

2,364,079

UNITED STATES PATENT OFFICE 2,364,079

CONDENSER WELDING SYSTEM

Hans Klemperer, Belmont, Mass., assignor to Raytheon Manufacturing Company, Newton, Mass., a corporation of Delaware Application April 15, 1943, Serial No. 483,149

9 Claims. (Cl. 320—1)

This invention relates to welding systems in which the electrical energy is stored in any suitable storage means, such as a condenser, for subsequent discharge through a welding load circuit in order to deliver welding current to a resistance welding load.

In condenser welding systems using very high capacities (for example 4000 mfd. or more) and corresponding high-turn ratios of the welding transformer (for example 600 to 1) the welding circuit is aperiodic. Accordingly the voltage of the welding transformer does not reverse, under these conditions, but decays slowly without changing its polarity. The usual shunt circuit, commonly provided across the terminals of the primary winding of the transformer, is ineffective in such aperiodic circuits since the shunt tube can only "pick up" upon reversal of the condenser voltage.

These characteristics of aperiodic circuits result in the delay of the operation of such welding systems in two ways: (1) The opening of the electrodes has to be postponed until the transformer current has died out in order to avoid "spitting." (2) The recharge of the condenser has to be withheld for a very considerable time because the series tube remains ignited and therefore continues to be conductive until the long decay period of the transformer voltage has been completed.

It is an object of the present invention to overcome the above-mentioned defects of high capacity welding systems and provide a system in which the decay current is terminated within a reasonable period of time thereby permitting the system to function at speeds of the same order as low capacity systems.

A further object of the invention is to provide a system in which the energy remaining in the welding circuit, at the moment of current interruption, is utilized to boost the residual condenser charge thereby reducing the line demand and also reducing the time required to charge the condenser.

Figure 1:
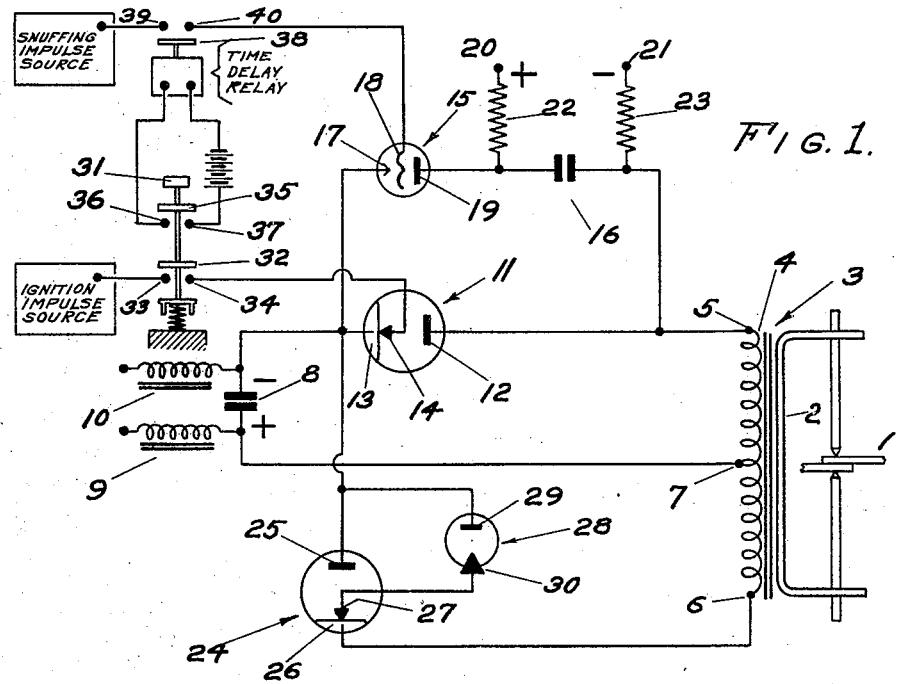
Figure 2:
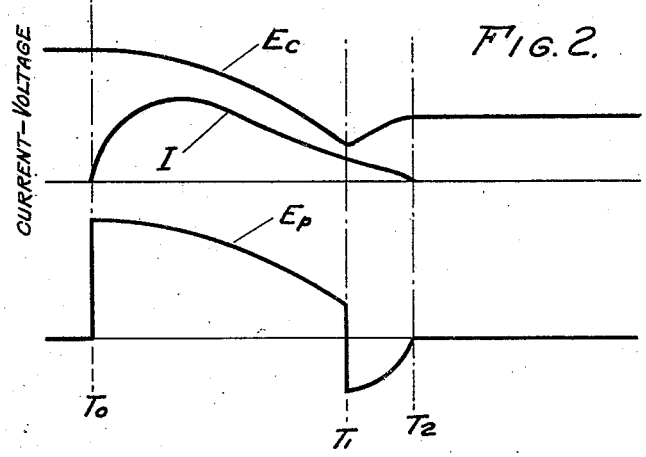

The above and other objects and features of the invention will be apparent to one skilled in the art from a consideration of the following detailed description taken in conjunction with the accompanying drawing in which:

Fig. 1 is a diagram of the condenser welding system embodying this invention; and Fig. 2 is a set of curves illustrating the mode of operation of the invention.

In the drawing, and referring first to Fig. 1 thereof, reference numeral 1 indicates a welding load to which welding current is to be supplied from a secondary loop 2 of a welding transformer 3 having a primary winding 4. The primary winding 4 is provided with end taps 5 and 6 and an intermediate tap 7. The welding energy is adapted to be supplied to the primary winding 4 from a condenser 8 adapted to be charged from any suitable source of direct current, such as a rectifier, a direct current generator, or a battery. Impedances 9 and 10, which are preferably inductances, are provided between condenser 8 and the positive and negative terminals, respectively, of the supply source. The positive side of the condenser 8 is connected to the intermediate tap 7 on the primary winding 4 and the negative side is connected to the end tap 5 of the primary winding 4 by way of a controlled ignition discharge tube 11. Tube 11 is preferably of the pool-cathode type having an anode 12 connected to the tap 5, and a pool type cathode 13 connected to the negative side of the condenser 8 and an igniter 14, which may be of any suitable type, but which is preferably of the electrostatic type consisting of a conductor separated and insulated from the cathode by a thin layer of glass. The igniter 14 is adapted to be supplied with timed ignition impulses in a manner hereinafter more fully described.

A shunt circuit is provided between the anode 12 and the cathode 13 of the tube 11, which circuit includes a rectifier tube 15 forming a snuffer tube in series with a snuffing condenser 16. The rectifier tube 15 may be of any suitable controlled type, but is preferably of the gas or vapor-filled type having a permanently energized cathode 17, a grid 18 and an anode 19. The cathode 17 may be of the permanently energized thermionic filament, or other suitable type. The grid 18 is adapted to be supplied with timed snuffing impulses in a manner to be hereinafter more fully described. The anode 19 is connected to the positive pole of the snuffing condenser 16. The snuffing condenser 16 may be supplied with direct current from any suitable source, such as a rectifier, direct current generator, or battery to which the condenser 16 is connected by positive and negative terminals 20 and 21, respectively. Impedances 22 and 23, which are preferably inductances, are provided between the condenser 16 and the positive and negative terminals 20 and 21, respectively.

A trailer tube 24, which is preferably of the same general type as series tube 11, is provided with an anode 25 connected with the cathode 13 of series tube 11. A pool type cathode 26 of the tube 24 is connected to the end tap 6 of the primary winding 4. Since the anode 25 of tube 24 is connected to the cathode 13 of tube 11 and is accordingly connected to the negative side of the condenser 8, the tube 24 may be operated as a simple rectifier because only negative voltage is supplied to the anode 25 up to the time it is desired to ignite this tube. Accordingly exciting voltages may be supplied to the igniter 27 of the tube 24 by means of a rectifier tube 28 having an anode 29 and a permanently energized cathode 30 connected, respectively, to the anode 25 and the igniter 27. It will be apparent that during periods when both the series tube 11 and the trailer tube 24 are conductive, a shunt circuit will be provided through these tubes between the two end taps 5 and 6 of the primary winding 4.

Ignition impulses for the igniter 14 are supplied from any suitable source and their timing may be controlled by the operator or by a suitable timing switch actuated automatically upon closure of the welding electrodes. This is shown diagrammatically by a push button switch 31, having an armature 32, adapted to close contacts 33 and 34 between the source of ignition impulses and the igniter 14. Actuation of the push button switch 31 simultaneously actuates an armature 35 which closes contacts 36 and 37 in a time delay relay circuit. The time delay relay functions to actuate an armature 38, at a predetermined time after the closure of contacts 36 and 37, and thereby closes contacts 39 and 40. The contacts 39 and 40 are positioned in the circuit between the snuffing impulse source and the grid 18 of the snuffing tube 15 to the end that snuffing impulses from the source will be supplied to the grid 18 at a predetermined time after the ignition of the series tube 11.

The operation of the system will be described in conjunction with the set of curves shown in Fig. 2. These curves do not purport to show the operation of the system quantitatively, although they do represent in a general qualitative manner the nature of said operation. It will be obvious that the curves apply to a system in which the capacity of the condenser bank 8 and the turn-ratio of the transformer 3 is such that the system is aperiodic.

The condenser 8 is charged to the desired potential from a suitable source capable of imposing such potential during the period intervening between successive welds. An ignition impulse is supplied to the igniter 14 from any suitable source, it being understood that this igniting impulse is timed in accordance with the well-known practice to occur after the electrodes have been applied with the desired pressure to the resistance welding load 1. Upon ignition of the series tube 11 by the igniter 14, the condenser 8 discharges through that portion of the welding transformer between the taps 7 and 5. As shown in the set of curves shown in Fig. 2, at the instant, indicated as T₀, that the tube 11 is ignited there is an abrupt increase in the transformer voltage indicated by the curve $E_p$ followed by a gradual decay. The condenser voltage gradually decays along a similar curve $E_c$, while the welding current rises more gradually than the transformer voltage and decays still more gradually as indicated by the curve I. After a given time, as for example at the time $T_1$, or after the voltage has declined to a given point, a snuffing impulse is supplied to the grid 18 due to the closure of the contacts 39 and 40 by the armature 38 of the time delay relay. It will be understood that the time delay relay functions to close the snuffing impulse circuit after a sufficient time has elapsed since the initiation of the discharge of condenser 8 to permit the current induced in the welding load to decay to a relatively low value, such as the relative value of the current indicated by the curve I at the time $T_1$.

The polarity of the condenser 16 is such that, upon conduction of the tube 15, it applies a voltage to the tube 11 in a non-conducting direction and therefore extinguishes conduction in said tube. Accordingly the series tube 11 is snuffed or extinguished by the energy received from snuffing the condenser 16. The discharge of the condenser 8 through the circuit provided by the upper portion of the primary winding 4 and the tube 11 is immediately terminated by the snuffing of the series tube 11. At this time, $T_1$, a substantial amount of energy is still stored in the load circuit including the transformer 3 which energy tends to cause current to continue to flow through the primary 4 in the same direction as before. The current, resulting from the energy stored in the load circuit, acts in the same direction as the energy stored in the condenser 16. Thus upon the extinction of the tube 11 the current from the primary 4 of the welding transformer 3 is deflected into the snuffer circuit in a direction to reverse the polarity of the condenser 16, that is to say, in the same direction in which this condenser tends to discharge through the tube 15, the trailer tube 24, and the primary 4 of the welding transformer 3. Thus the trailer tube 24, the anode 25 of which is connected to the cathode side of series tube 11, and accordingly to the cathode 17 of the thyratron 15, is subjected to a considerable potential difference between its anode 25 and its cathode 26. Simultaneously an igniting impulse is supplied to the igniter 27 of trailer tube 24 by way of rectifier tube 28, the cathode 30 of which is connected to the igniter 27. Thus the tube 24 is ignited and becomes conductive substantially immediately upon the snuffing of the series tube 11. Momentarily a shunt circuit exists between the two end taps 5 and 6 of the primary winding 4, which shunt circuit includes the snuffing condenser 16, the thyratron 15, and the trailer tube 24. However, this shunt path is effective only until a counter voltage has been built up upon the condenser 16, that is to say until the polarity of this condenser has reversed. Thereupon there is no effective shunt circuit between the two ends 5 and 6 of the primary winding 4, but an effective circuit exists between the two poles of the condenser 8 by way of the trailer tube 24 and that portion of the primary winding between the end tap 6 and the intermediate tap 7 so that the energy of the load circuit is fed from the primary 4 by way of the intermediate tap 7 to the positive side of the condenser 8, that is to say in the same direction as the charging current for this condenser. Accordingly there is an abrupt reversal of the transformer voltage at the point $T_1$ while the condenser voltage begins to rise as shown by the portion of the curve $E_c$ between the point $T_1$ and $T_2$. By the time $T_2$ the transformer voltage $E_p$ has returned to zero and the energy remaining in the transformer at the time $T_1$, when the series tube 11 was snuffed, has been returned to the condenser 8 as indicated by that portion of the curve $E_c$ between the time $T_1$ and $T_2$.

Although there has been herein described but a single embodiment of the present invention other embodiments within the scope of the appended claims will be obvious to those skilled in the art from a consideration of the form shown.

What is claimed is:

1. An electrical system comprising a condenser, means for charging said condenser, a load circuit, means for discharging said condenser through said load circuit, means to terminate the flow of current from said condenser through said load circuit prior to the complete discharge of said condenser, and means to return the remaining energy of said load circuit back to said condenser in the same polarity as said charging means.

2. An electrical system comprising a condenser, means for charging said condenser, a load circuit including a transformer having a primary circuit including said condenser, said circuit being aperiodic, means in said circuit for controlling the discharge of said condenser, means effective prior to the complete discharge of said condenser for terminating the discharge thereof and returning the remaining energy of said load circuit back to said condenser in the same polarity as said charging means.

3. An electrical system comprising a condenser, means for charging said condenser, a load circuit including a transformer having a primary circuit connected with said condenser and a secondary circuit including a load, circuit controlling means for permitting the partial discharge of said condenser through at least a portion of said primary circuit, means to terminate said partial discharge and means to return the remaining energy of said load circuit back to said condenser in the same polarity as said charging means.

4. An electrical system comprising a condenser, means for charging said condenser, a load circuit including a transformer having a primary circuit connected with said condenser and a secondary circuit including a load, circuit controlling means for permitting the partial discharge of said condenser through a portion of said primary circuit, means to terminate said partial discharge and means to return the remaining energy of said load circuit back to said condenser in the same polarity as said charging means through another portion of said primary circuit.

5. An electrical system comprising a condenser, means for charging said condenser, a load circuit including a transformer having primary windings a portion of which are connected to opposite poles of said condenser and forming therewith an aperiodic circuit, means in said circuit for controlling the discharge of said condenser, means effective prior to the complete discharge of said condenser for terminating the discharge thereof, and a second circuit including a second portion of said primary windings for returning the remaining energy of said load circuit back to said condenser in the same polarity as said charging means.

6. An electrical system comprising a condenser, means for charging said condenser, a load circuit including a transformer having a primary circuit including said condenser, said circuit being aperiodic, a controlled ignition discharge tube in said circuit for controlling the discharge of said condenser, means effective prior to the complete discharge of said condenser for snuffing said tube and thereby terminating the discharge of said condenser, and means for returning the remaining energy of said load circuit back to said condenser in the same polarity as said charging means.

7. An electrical system comprising a condenser, means for charging said condenser, a load circuit including a transformer having a primary circuit including said condenser, said circuit being aperiodic, a controlled ignition discharge tube in said circuit for controlling the discharge of said condenser, means effective prior to the complete discharge of said condenser for snuffing said tube and thereby terminating the discharge of said condenser, and means including a second controlled ignition discharge tube for returning the remaining energy of said load circuit back to said condenser in the same polarity as said charging means.

8. An electrical system comprising a condenser, means for charging said condenser, a load circuit including a transformer having a primary circuit connected with said condenser and a secondary circuit including a load, an ignition controlled discharge tube in said primary circuit controlling the partial discharge of said condenser through a portion of said primary circuit, and means effective after a predetermined time delay to snuff said tube and thereby terminate said partial discharge and return the remaining energy of said load circuit back to said condenser in the same polarity as said charging means.

9. An electrical system comprising a condenser, means to charge said condenser, a load circuit including a transformer having a primary circuit connected with said condenser and a secondary circuit including a load, an ignition controlled discharge tube in said primary circuit controlling the partial discharge of said condenser through a portion of said primary circuit, a shunt circuit including a snuffing condenser, means to charge said snuffing condenser, means connecting the positive pole of said snuffing condenser with the cathode of said ignition controlled discharge tube, said means including a controlled discharge tube timed to supply snuffing impulses from said snuffing condenser to said first mentioned tube and thereby terminate said partial discharge and return the remaining energy of said load circuit back to said condenser in the same polarity as said charging means.

HANS KLEMPERER.